Feb. 4, 1941.   E. P. KENNEDY   2,230,570
REFLEX SCANNER
Filed March 19, 1938    2 Sheets-Sheet 1
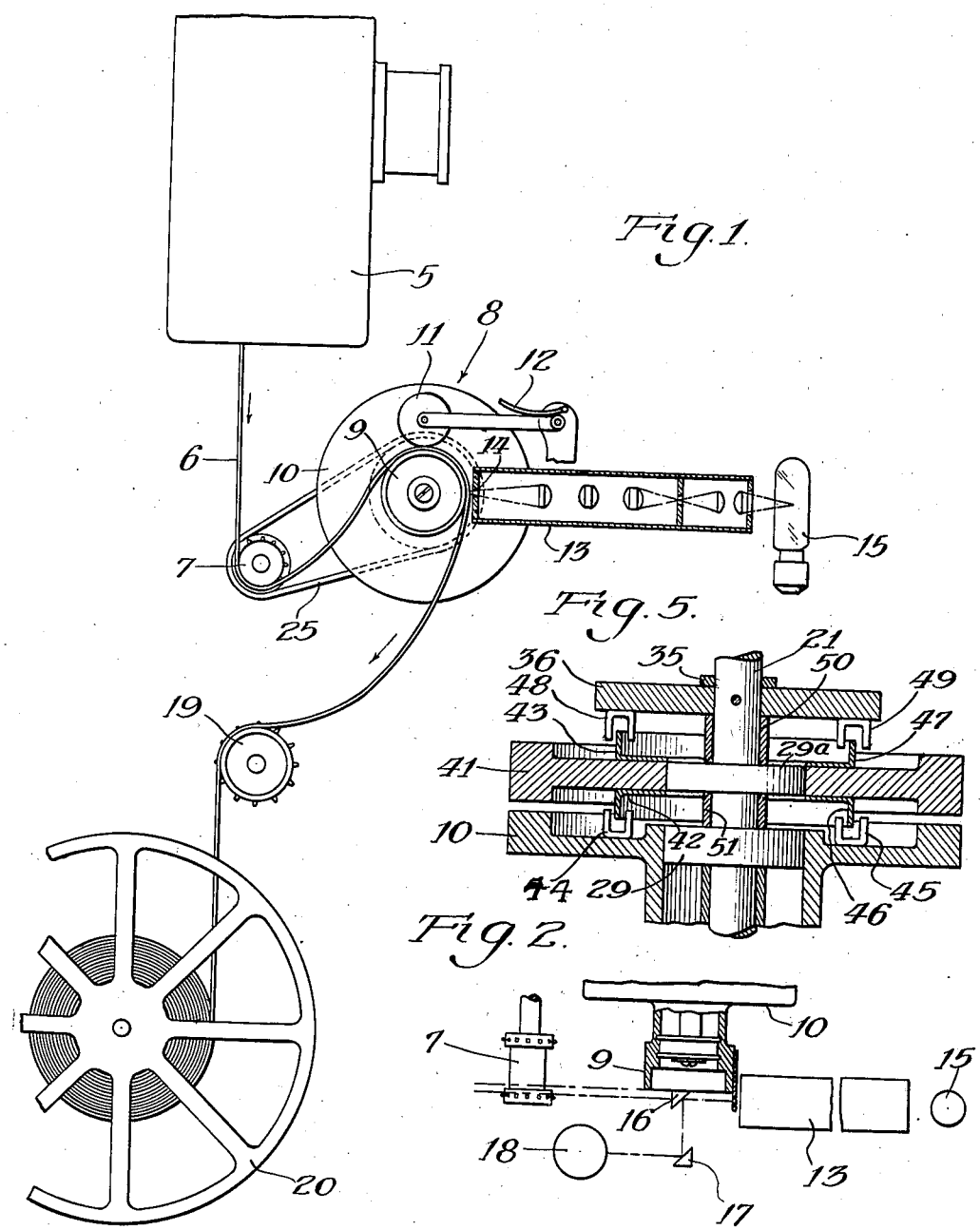
Inventor:
Edward P. Kennedy,
By Zabel, Carlson, Greybaugh & Wells
Attorneys Feb. 4, 1941. E. P. KENNEDY 2,230,570
REFLEX SCANNER
Filed March 19, 1938 2 Sheets-Sheet 2

Inventor:
Edward P. Kennedy

Patented Feb. 4, 1941

2,230,570

UNITED STATES PATENT OFFICE 2,230,570

REFLEX SCANNER

Edward P. Kennedy, Berwyn, Ill., assignor to Motiograph Inc., Chicago, Ill., a corporation of Illinois Application March 19, 1938, Serial No. 196,883

8 Claims. (Cl. 271—2.3)

The present invention relates to scanning devices, and more particularly to means for controlling the velocity of a motion picture film sound track or similar film ribbon or sheet past a given fixed point or scanning aperture. The matter of obtaining a generally uniform velocity of motion picture film past a scanning aperture has in the past been the subject of much effort on the part of engineers and others skilled in this art. Generally speaking, all the devices for this purpose utilize an inertia or fly-wheel member as a means of stabilizing the velocity of the film past the scanning aperture. It is well-known in the art that such a device, while effective generally, is inclined to respond to minute variations in speed by acceleration and deceleration to an excess so as to set up what is normally called "hunting" in the movement of the inertia mover. Damping means have been employed to prevent this hunting action and to further stabilize the velocity of the film. The present invention employs a means of damping which is capable of more readily accomplishing the transfer of the retarding or accelerating forces, whereby to permit of necessary adjustments, due to variation in film length, of the inertia member without the incidental hunting that has been the cause of inadequately stabilizing of the film movement past the scanning aperture.

It is the purpose of the present invention to provide a device of this character wherein the film is caused to maintain an approximately uniform velocity past the scanning aperture by a mechanism including a film compliance section composed of a drum and an inertia stabilizer, a speed reference section coupled with the film sprockets and a governor which interlinks the film compliance section and the speed reference section. These parts are used with a film compliance roller which enforces contact between the film and the film compliance section so that the film riding on the drum of the film compliance section takes the speed of the drum.

The features and advantages of the invention will appear more in detail from the following description, reference being had to the accompanying drawings wherein a preferred form of the invention is shown. It is to be understood, however, that the drawings and description are illustrative only, and are not to be taken as limiting the invention except insofar as it is limited by the claims.

In the drawings,

Fig. 1 is a diagrammatic view of a motion picture projecting apparatus showing the several parts that cooperate with the device embodied in the present invention;

Fig. 2 is a fragmentary diagrammatic view illustrating the optical system by which light is passed through the sound track to a light responsive device;

Fig. 5 is a fragmentary sectional view taken on substantially the same line as Fig. 3 and showing a modification.

Figure 3:
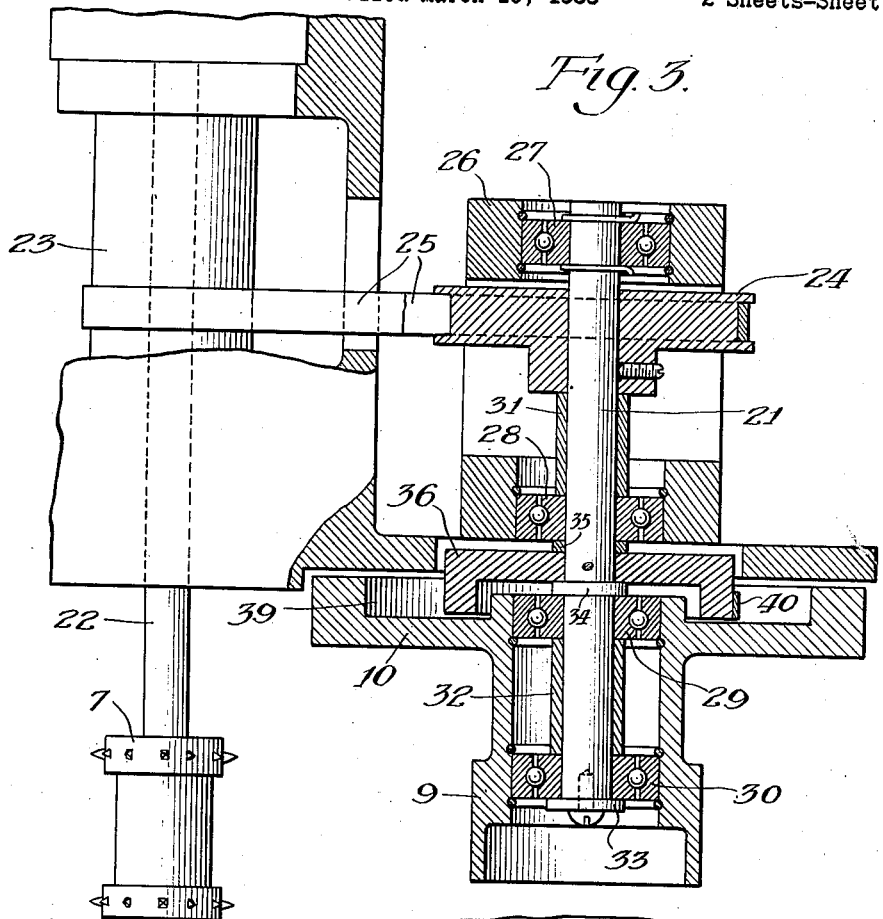
Fig. 3 is a plan sectional view through the film speed controlling device embodying the present invention.
Figure 4:
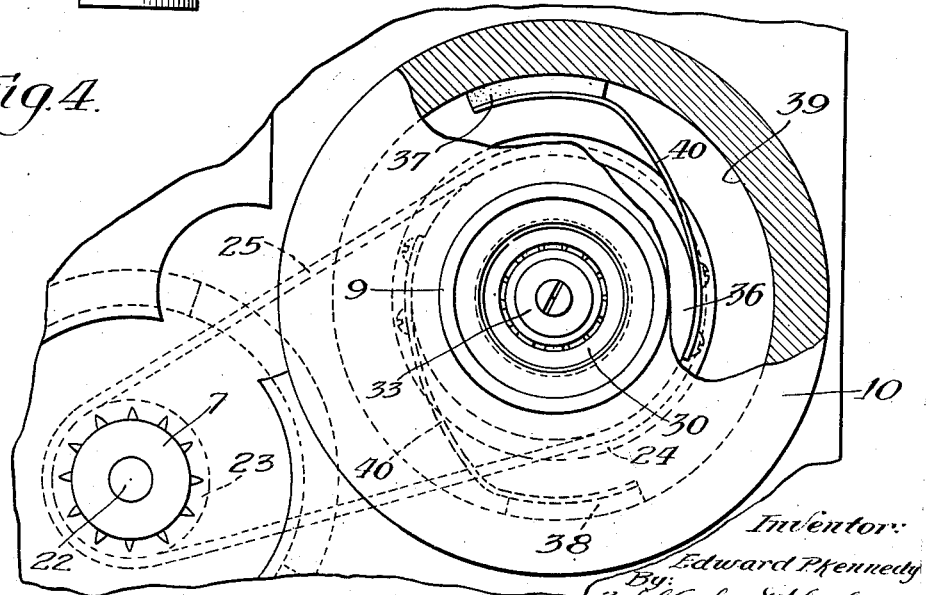
Fig 4 is a view in side elevation of the device shown in Fig. 3, certain parts being broken away to illustrate the interior construction.

Referring now to the drawings, the invention is embodied in a motion picture projecting machine where the projector of the picture is illustrated at 5. A film 6 having a sound track thereon is led from the projector 5 to a feed sprocket 7 that feeds the film to a scanning device 8. The scanning device embodies a drum 9 over which the film passes and an inertia member 10 mechanically connected therewith and a compliance roller 11 which presses the film against the drum 9. The compliance roller 11 may be spring pressed against the film by a suitable spring 12. A lens assembly 13 having a light slit 14 therein is arranged to transmit light from a lamp 15 to the sound track on the film. The drum is so arranged with respect to the sprocket 7 that the sound track does not ride on the drum but projects beyond the end of it. An optical system comprising suitable light reflectors 16 and 17 directs light passing through the sound track of the film to a photo-electric cell 18. Film from the drum 9 is passed over a take-away sprocket 19 to a reel 20 upon which it is re-wound. The sprockets 7 and 19 are, as is common in this art, driven at the same surface speed so as to feed in and take away the film at the same rate.

The present invention concerns itself with the means for controlling the speed of the film as it passes around the drum 9 and past the slit 14. The slit 14 constitutes the scanning aperture and the quality of sound reproduction depends to a great degree upon the uniformity of velocity at which the film passes the scanning aperture.

The drum 9 and the inertia member 10 which is rigid therewith constitute a film compliance section which, by frictional engagement with the film and the aid of the roller 11, causes the film to assume the speed of the drum 9. The drum 9 is coupled, in a manner which will be presently explained, to a speed reference section. The speed reference section comprises a driven shaft 21 which is driven at a speed proportionate to the speed of the sprocket 7. This is accomplished by coupling the shaft 21 to a shaft 22 which drives the sprocket 7 by two pulleys 23 and 24. The pulley 23 is fixed on the shaft 22 and the pulley 24 is fixed to the shaft 21. A belt 25 connects the pulleys. The shaft 21 is mounted in a supporting framework 26 by a suitable ball bearings 27 and 28. The drum 9 is mounted on the shaft 21 by ball bearings 29 and 30. The several bearings on the shaft 21 are spaced apart by suitable sleeves 31 and 32 and an end washer 33. The spacing sleeves 31 and 32 and the end washer 33 cooperate with a collar 34 on the shaft 21 and a washer 35 to space the several parts carried by the shaft 21 properly along the shaft. These parts include a velocity governor member 36 which is fixed on the shaft 21 between the collar 34 and the washer 35.

The drum 9 may rotate freely upon the shaft 21 insofar as its bearings thereon are concerned. However, means are provided for connecting the governor member 36 with the drum 9 so as to accomplish a "dead beat" energy transfer from the shaft 21 to the drum 9, or vice versa. This means may be of any suitable character, such as electric, fluid, simple friction, or a combination thereof. For the purpose of the present invention, I have shown the dead beat energy transfer means as of the friction type where friction shoes 37 and 38 are carried by springs 40 which are fixed to the governor member 36. The shoes 37 and 38 bear on an interior annular surface 39 of the member 10. Thus any tendency of the drum 9 to change from the reference speed of the shaft 21 is opposed by the dead beat coupling between the member 36 and the member 10.

In order that the operation of this device may be more clearly understood, a brief description of the operation will be given. When the device is in use, the film 6 leaves the projector and passes to the sprocket 7 which is driven at a substantially constant speed. From the sprocket 7 the film passes directly to the drum 9 of the scanning device where it is held in compliance with the drum by the roller 11. The film then passes the scanning aperture 14 and continues to the take-up sprocket 19. The two sprockets 7 and 19 maintain consistently an approximately equal length of film between the two sprockets.

The drum 9 functions to stabilize the film loop between the sprockets 7 and 19 by taking its reference speed, be it plus, minus or synchronous, directly from the speed at which the sprockets are driven. The size of the drum 9 is chosen so that the speed of the film in contact with the drum is very close to the speed of the film over the sprockets. In any case, however, there is difficulty because the film may vary as to length when compared to number of holes in a given length of film. Also, there is some mechanical variation between the size of the drum and the exact size it should have for a given sprocket size.

To give a specific example of the problems involved: the sprocket normally revolves at about 360 R. P. M. to propel film at the standard rate of 90 feet per minute. If the drum 9 were 1.740 inches in diameter it would have to revolve about 197.5706 revolutions per minute to synchronize with the sprocket speed at 90 feet per minute. The drum is therefore coupled through the governor member 36 to the shaft 21 which rotates also at approximately 197.5706 R. P. M. If all of the parts were driven continuously at the exact speeds, no problem would be involved. However, due to variations from the exact measurements given, and due to splices in the film, the film may tend to move slightly faster than the drum or slightly slower.

It is the function of the means carrying and driving the drum 9 to take care of the variations in film speed while maintaining the general reference speed. If the film tends to pull the drum slightly faster than the reference speed, the change is immediately opposed by the inertia of the drum 9 and the member 10. This opposition would be overcome slightly and the drum 9 and member 10 would speed up if they constituted only a fly-wheel because energy would be transferred to them from the film. The retarding action of the coupling between the drum and the member 36 opposes the speeding up of the drum and although it permits slippage of the drum with respect to the member 36, it quickly stabilizes the drum speed at the reference speed of the shaft 21. If the film tends to slow down again, the change is opposed by the inertia of the members 9 and 10, and they in turn draw energy from the member 36 to arrive at the fixed reference speed with a minimum of variation in the velocity of the film. The speed of the drum 9 is rendered practically independent of the sprocket tooth jerks upon the film and these are all taken up in the slack of the film between the sprocket wheels and the drum. The ability of the drum to shift with respect to the reference member 36, due to the bearing thereon and the dead-beat connection therewith, permits the drum to remain balanced in position between the sprocket wheels 7 and 19 so that there is slack on both sides of the drum.

The modification in Fig. 5 constitutes another form of connection between the speed reference section and the film compliance section of the scanning device. In this form of the invention the shaft 21 is utilized as in the previous form. The speed reference member 36 is fixed on the shaft 21 as before. The drum 9 and its associated inertia member 10 are journalled on the shaft 21 as in the main form of the invention. However, a fly-wheel 41 is interposed between the member 36 and the member 10.

The flywheel 41 is journalled on the shaft 21, a suitable bearing 29a being provided for it. The fly-wheel 41 has two copper rings 42 and 43 secured on opposite sides thereof. The member 10 has magnets 44 and 45 fixed thereon. The magnets shown are permanent U-shaped magnets. The ring 42 includes an annular flange 46 which rides between the opposite poles of the magnets 44 and 45.

The ring 43 has an annular flange 47. The member 36 carries two magnets 48 and 49 which are like the magnets 44 and 45. The foregoing parts constitute an electrical type of dead-beat coupling between the speed reference member 36 and the drum 9. Spacing sleeves 50 and 51 serve to space the fly-wheel 41 between the member 10 and the member 36.

The present construction is of particular importance in that it avoids bearing problems and their effect upon the stabilizing of film velocity. The power driven shaft 21 carries all of the parts. Therefore, the bearings for the drum do not carry the whole function of free operation such as they have to do in the fly-wheel type of device. Since the relative movement between the drum 9 and the shaft 21 is at most comparatively small, the effect of a little more or less friction in the bearings becomes relatively unimportant.

Having thus described my invention, what I claim as new and desire to secure by Letters Patent is:

1. In a film scanning device of the character described having a film supply sprocket and a film take-up sprocket and means interposed between said sprockets for guiding the film past a scanning aperture, the combination of a film compliance drum adapted to directly engage the film, a power driven shaft on which said drum is rotatably mounted, drive means coupling said shaft and the film sprockets whereby they are driven at substantially synchronous speed, and damping means coupling the drum to the shaft.

2. In a film scanning device of the character described having a film supply sprocket and a film take-up sprocket and means interposed between said sprockets for guiding the film past a scanning aperture, the combination of a film compliance drum adapted to directly engage the film, a power driven shaft on which said drum is rotatably mounted, drive means coupling said shaft and the film sprockets whereby they are driven at substantially synchronous speed, and damping means coupling the drum to the shaft, said damping means comprising an inertia member on the drum and a dead-beat coupling between said member and the shaft.

3. In a film scanning device of the character described having a film supply sprocket and a film take-up sprocket and means interposed between said sprockets for guiding the film past a scanning aperture, the combination of a film compliance drum adapted to directly engage the film, a power driven shaft on which said drum is rotatably mounted, drive means coupling said shaft and the film sprockets whereby they are driven at substantially synchronous speed, and damping means coupling the drum to the shaft, said means including a friction connection between the drum and said shaft whereby the pull of the film on the drum may shift the angular position of the drum with respect to the shaft.

4. Means for controlling the speed variations in linear travel of a strip of material such as a film, comprising a rotatable drum on which the strip of material rides, means for pressing the strip against the surface of the drum whereby to cause it to assume the speed of the drum, drive means for the drum and drive means for advancing the strip to the drum, said drive means being coupled so as to feed the strip to the drum at a speed substantially equal to the speed imparted to the drum by its drive means, said drum being supported solely by its drive means and coupled to its drive means by a dead-beat coupling whereby angular shifting of the drum with respect to its drive means may be had.

5. In a system of the character described, means for controlling the speed of a strip of material such as a film past a reference point such as a scanning aperture, said means comprising strip feeding and take-up members, a speed reference shaft coupled to said members and driven therefrom, a speed compliance drum engaging the strip and rotatably journalled on said speed reference shaft, and means coupling the drum and speed reference shaft yieldingly opposing relative angular movement of one with respect to the other.

6. Means for controlling the linear velocity of a strip of material such as a film past a reference point, said means comprising a rotatable drum at the reference point, means for holding the strip against the surface of the drum, a rotating speed reference member providing the sole bearing support for said drum, control means connecting the drum and said member and tending to cause the drum to assume the speed of the speed reference member, and positive feed means for feeding the strip to the drum, said speed reference member being coupled to the feed means.

7. Means for controlling the linear velocity of a strip of material such as a film past a reference point, said means comprising a rotatable drum at the reference point, means for holding the strip against the drum, a rotating speed reference member, said drum being rotatably mounted on said member, control means connecting the drum and said member and tending to cause the drum to assume the speed of the speed reference member, and positive feed means for feeding the strip to the drum, said speed reference member being coupled to the feed means.

8. In a film scanning device of the character described, a film supply sprocket and a film take-up sprocket and means interposed between said sprockets adapted to guide the film past a scanning aperture and to maintain the relative tensions on the film substantially the same between the scanning aperture and the two sprockets, said means comprising a film compliance drum upon which the film rides, means for holding the film in contact with said drum whereby to cause the drum and the film to travel at the same speed and drive means for said drum comprising a shaft, means coupling the shaft to the film sprockets, said drum being rotatably mounted on the shaft, said coupling means connecting the shaft and film sprockets so as to drive them at substantially synchronous speed, and dead beat coupling means between the drum and the shaft.

EDWARD P. KENNEDY.